(12) United States Patent
Webb

(10) Patent No.: US 10,036,620 B2
(45) Date of Patent: Jul. 31, 2018

(54) RETRACTABLE MEASURING AND CUTTING DEVICE

(71) Applicant: Victor S. Webb, Mableton, GA (US)

(72) Inventor: Victor S. Webb, Mableton, GA (US)

(*) Notice: Subject to any disclaimer, the term of this patent is extended or adjusted under 35 U.S.C. 154(b) by 119 days.

(21) Appl. No.: 14/969,246

(22) Filed: Dec. 15, 2015

(65) Prior Publication Data

US 2016/0178338 A1    Jun. 23, 2016

Related U.S. Application Data

(60) Provisional application No. 62/093,454, filed on Dec. 18, 2014, provisional application No. 62/265,541, filed on Dec. 10, 2015.

(51) Int. Cl.
| | | |
|---|---|---|
| *G01B 3/10* | (2006.01) | |
| *E04F 21/00* | (2006.01) | |

(52) U.S. Cl.
CPC ........ *G01B 3/1084* (2013.01); *E04F 21/0076* (2013.01); *G01B 2003/1089* (2013.01)

(58) Field of Classification Search
CPC ...... B26B 29/00; B26B 29/06; E04F 21/0076; G01B 3/10; G01B 3/1084; G01B 2003/1087; G01B 2006/1089
USPC .................... 33/42, 293, 294, 756, 760, 770
See application file for complete search history.

(56) References Cited

U.S. PATENT DOCUMENTS

| | | | | | |
|---|---|---|---|---|---|
| 2,581,858 | A | * | 1/1952 | Hilt et al. ............ | G01B 3/1071 33/27.03 |
| 3,286,351 | A | * | 11/1966 | McAlister ................ | B25H 7/04 30/263 |
| 3,478,427 | A | * | 11/1969 | Tims, Jr. ................. | B26B 5/005 30/293 |
| 4,642,899 | A | * | 2/1987 | Fass et al. ........... | G01B 3/1061 33/760 |
| 4,890,393 | A | * | 1/1990 | St. Jean ............... | G01B 3/1071 33/42 |
| 4,976,037 | A | * | 12/1990 | Hines ...................... | B26B 11/00 33/27.03 |
| 5,404,647 | A | * | 4/1995 | Prater ..................... | B26B 29/06 30/293 |

(Continued)

FOREIGN PATENT DOCUMENTS

| | | | | | |
|---|---|---|---|---|---|
| JP | | 2001205984 A | * | 7/2001 | ............. B26B 11/00 |
| WO | WO | 9719791 A1 | * | 6/1997 | ............... B26B 3/08 |

OTHER PUBLICATIONS

Mastercraft Maximum Drywall Axe, Canadian Tire (Dec. 12, 2013), http://www.redflagdeals.com/deal/home-improvement-tools/mastercraft-maximum-drywall-axe-19-99-30-off/ (Last Visited: Nov. 3, 2016).

(Continued)

*Primary Examiner* — R. A. Smith
(74) *Attorney, Agent, or Firm* — Thomas | Horstemeyer, LLP

(57) ABSTRACT

Disclosed are various embodiments for a measuring and cutting device having, for example, a measuring tool disposed between a first handle component and a second handle component. The first handle component and the second handle component may be coupled by the measuring tool disposed between the first handle component and the second handle component. The measuring tool may comprise a flexible bistable spring steel band or a rigid material. The first handle is configured to join the second handle to form a uniform body.

20 Claims, 13 Drawing Sheets

(56) References Cited

U.S. PATENT DOCUMENTS

| | | | | |
|---|---|---|---|---|
| 5,542,184 | A * | 8/1996 | Beard | B26B 29/06 30/293 |
| 6,935,045 | B2 * | 8/2005 | Cubbedge | G01B 3/1071 33/42 |
| RE39,719 | E * | 7/2007 | Murray | G01B 3/1082 33/755 |
| 7,454,845 | B2 * | 11/2008 | Wise | G01B 3/1056 33/758 |
| 8,020,312 | B1 * | 9/2011 | McGahan | B26B 29/06 30/286 |
| 9,511,499 | B2 * | 12/2016 | Gully | B26B 11/00 |
| 2003/0019116 | A1 * | 1/2003 | DeWall | G01B 3/1041 33/42 |
| 2005/0022390 | A1 * | 2/2005 | Whitemiller et al. | B23D 49/14 30/144 |
| 2009/0249636 | A1 * | 10/2009 | Reda et al. | B26B 29/06 33/760 |

OTHER PUBLICATIONS

Drywall Axe, Pauze Innovations (Jul. 9, 2012), http://www.pauzeinnovations.com/product-development-media/links/drywall-axe/ (Last Visited: Nov. 3, 2016).

Maximum Drywall Axe, YouTube (Nov. 25, 2014), https://www.youtube.com/watch?v=WgFxp-JcYuY (Last Visited: Nov. 3, 2016).

* cited by examiner

RETRACTABLE MEASURING AND CUTTING DEVICE

CROSS-REFERENCE TO RELATED APPLICATIONS

This application claims the benefit of and priority to U.S. Provisional Patent Application No. 62/093,454, entitled "RETRACTABLE MEASURING AND CUTTING DEVICE," filed Dec. 18, 2014, and to U.S. Provisional Patent Application No. 62/265,541, entitled "RETRACTABLE MEASURING AND CUTTING DEVICE," filed Dec. 10, 2015, the contents of which are both hereby incorporated by reference in their entirety herein.

BACKGROUND

Cutting drywall and other materials typically requires a substantial amount of measuring and marking before performing a cut. For example, a drywall worker may desire to have a 46 inch board of drywall. However, drywall boards are generally sold in eight-foot, ten-foot, and twelve-foot boards. Accordingly, to cut an eight-foot drywall board to 46 inches, the drywall worker must measure 46 inches from an end of the eight-food drywall board, use a T-square to draw a straight line down a height of the drywall board, and must perform a precise cut down the drawn line.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a retractable measuring and cutting device that may be used to perform precise cuts of various materials, such as drywall. As noted above, cutting drywall and other materials typically requires a substantial amount of measuring and marking before performing a cut. For example, a drywall worker may desire to have a 46 inch board of drywall. However, drywall boards are generally sold in eight-foot, ten-foot, and twelve-foot boards. Accordingly, to cut an eight-foot drywall board to 46 inches, the drywall worker must measure 46 inches from an end of the eight-food drywall board, use a T-square (or other device) to draw a straight line down a height of the drywall board, and must perform a precise cut down the drawn line. Performing precise measurements, drawing precise lines, and making accurate cuts remains problematic. Moreover, measuring and drawing lines costs drywall and other workers a considerable amount of time.

In the following discussion, a general description of a retractable measuring and cutting device and its components is provided, followed by a discussion of the operation of the same.

Figure 1A:
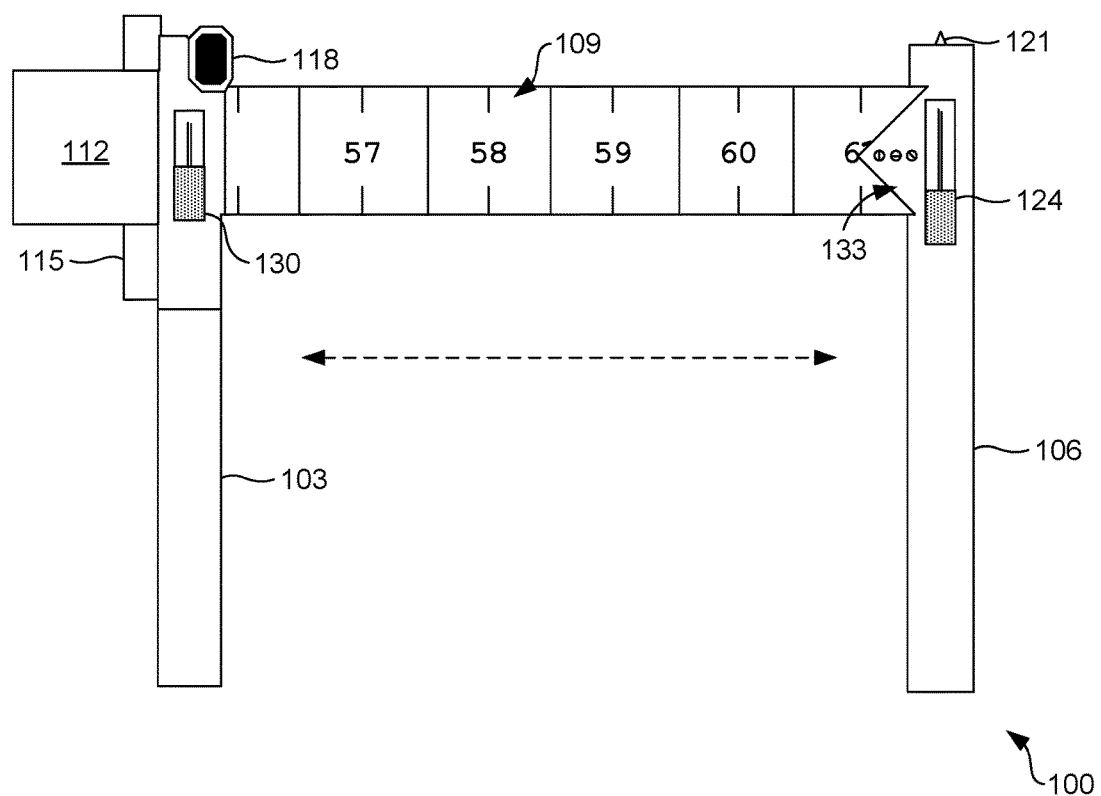
FIGS. 1A-1F are drawings of embodiments of a retractable measuring and cutting device according to various embodiments of the present disclosure.

With reference to FIG. 1A, shown is a non-limiting example of a retractable measuring and cutting device 100 according to various embodiments of the present disclosure. In the non-limiting example of FIG. 1A, the retractable measuring and cutting device 100 comprises a first handle 103, a second handle 106, a measuring tool 109, a measuring tool storage 112, a guide 115, a marking utensil holder 118, a blade 121, a blade retractor 124, a measuring tool lock 130, a mounting block 133, and/or other components as may be described herein.

The first handle 103 and the second handle 106 may comprise plastic, metal, rubber, any suitable material, or a combination thereof configured to be handled by an operator using a first hand and a second hand. For example, the left hand of the operator may be used to grip the first handle 103 and the right hand of the operator may be used to grip the second handle 106, or vice versa. The measuring tool lock 130 may be located on the first handle 103, or other handle coupled to the measuring tool storage 112. The location of the components may be flipped to make a retractable measuring and cutting device 100 suited for left-handed operators.

The measuring tool 109 may comprise measuring tape, a measuring band, or a similar device, that provides the operator of the retractable measuring and cutting device 100 with one or more dimensions that may be employed to cut a material at a defined location. In various embodiments, the measuring tool 109 comprises a bistable spring band with one or more dimensions set thereon. It is understood that various dimensions may be printed, laminated, or otherwise set on the measuring tool 109. For example, the measuring tool 109 may comprise a first set of dimensions (e.g., inches, feet, or other unit of measurement) located a top of the measuring tool 109 and a second set of dimensions (e.g., millimeters, centimeters, meters, or other unit of measurement) located at a bottom of the measuring tool 109. In other embodiments, the measuring tool 109 may comprise a single set of dimensions (e.g., inches, feet, millimeters, centimeters, meters, or other unit of measurement) located at an appropriate location of the measuring tool 109.

In some embodiments, the measuring tool 109 comprises a first set of dimensions at a top of the measuring tool 109 and a second set of dimensions at the bottom of the measuring tool 109, wherein the first set of dimensions and the second set of dimensions are in a same unit of measurement. However, the first set of dimensions and the second set of dimensions may be inversed. For example, assume a measuring tool 109 comprises a length of 96 inches. The first set of dimensions of the measuring tool 109 may count (from left to right), 1", 2", 3", 4", 5", and so forth. Directly underneath the first set of dimensions, the measuring tool 109 may count (from left to right), 96", 95", 94", 93", 92", and so forth.

In various embodiments, a length of the measuring tool 109 may comprise approximately 96 inches, 72 inches, 90 inches, 48 inches, or any other suitable length. As may be appreciated, in embodiments where the measuring tool 109 comprises a length of 73 inches, the retractable measuring and cutting device 100 may be used to perform cuts on a 12-foot board. In embodiments where the measuring tool 109 comprises a length of 61 inches, the retractable measuring and cutting device 100 may be used to perform cuts on a ten-foot board. Similarly, in embodiments where the measuring tool 109 comprises a length of 49 inches, the retractable measuring and cutting device 100 may be used to perform cuts on a eight-foot board. A length of the measuring tool 109 may be determined via:

$$\text{Length of Measuring Device} = (\text{Length of Board}/2) + 1. \quad (\text{eq. 1})$$

or:

$$\text{Length of Measuring Device} = (\text{Length of Board}/2). \quad (\text{eq. 2})$$

When in operation, the measuring tool 109 may extract from an interior of the measuring tool storage 112 to an exterior located in a position between the first handle 103 and the second handle 106. To this end, the measuring tool storage 112 may comprise a bistable steel spring band or other suitable device that facilitates the extraction and the retraction of the measuring tool 109 while providing some support between the first handle 103 and the second handle 106.

For example, when the measuring tool 109 is pulled from an interior of the measuring tool storage 112 to an exterior, a spring inside the measuring tool storage 112 may unwind, thereby storing energy in the spring itself that will be used to retract the measuring tool 109 in a coil (or other minimized position). The measuring tool lock 130 may comprise a switch that grabs and holds the measuring tool 109 at its position to prevent the spring in the interior of the measuring tool storage 112 from retracting the measuring tool 109. As can be appreciated, when the measuring tool lock 130 is released, the spring in the measuring tool storage 112 pulls the measuring tool 109 back into the interior of the measuring tool storage 112.

The guide 115 may be used to position and retain the retractable measuring and cutting device 100 at an end of a particular type of material, such as drywall, tile, particle board, cardboard, plywood, linoleum, brick, stone, string, plexiglass, glass, and/or any other suitable material. To this end, the guide 115 may comprise an L-shaped projection that causes an end of the material to closely conform to the guide 115, thereby securing the material to the first handle 103.

The marking utensil holder 118 may comprise an outlet for a marking utensil, such as a pen, pencil, or marker, to be inserted and retained by the retractable measuring and cutting device 100. To this end, the marking utensil holder 118 may be configured to closely conform to one or more types of marking utensils or, in some embodiments, pivot utensils such as a compass spike. In various embodiments, the outlet may be circular-shaped to closely conform to common pens, pencils, and/or markers. In some embodiments, the outlet may be hexagonal-shaped to closely conform to pens, pencils, markers, or other marking utensils that comprise a hexagonal-shaped body. Although the embodiments described discuss pens, pencils, and/or markers, other marking utensils may be employed such as chalk or any other material that creates marks on a surface of a suitable material. Additionally, although shown on the first handle 103, the marking utensil holder 118 may be positioned on the second handle 106 in a location suitable for marking a cut.

The blade 121 may comprise a utility knife blade, an X-Acto® knife blade, or a box cutter blade according to various embodiments. As can be appreciated, the blade 121 may comprise a blade suitable for cutting different types of materials. For example, assuming an operator of the retractable measuring and cutting device 100 desires to cut tile or stone, the blade 121 may comprise a diamond blade commonly used to cut tile and stone. In various embodiments, the blade 121 may comprise a steel blade, a carbide blade, a diamond blade, an abrasive blade, or any other suitable blade.

The blade retractor 124 may comprise a component that allows an operator to adjust a length corresponding to how far the blade 121 extends from the second handle 106. For example, the blade 121 can be extended to a length to score drywall without performing a cut through an entirety of the drywall. For purposes herein, the term cut is defined to include both cutting through a material as well as scoring a surface of the material. In various embodiments, the blade 121 may be replaced with a spare blade stored in an interior of the measuring tool storage 112, the first handle 103, and/or the second handle 106. For example, an interior of the first handle 103 and/or the second handle 106 may be accessed by removing a screw and opening the handle.

The mounting block 133 may be configured to secure the measuring tool 109 to the second handle 106. To this end, the mounting block 133 may comprise a triangular-shaped projection of the second handle 106 that may be screwed or otherwise fixed into an end of the measuring tool 109.

Next, a general description of the operation of the various components of the retractable measuring and cutting device 100 is provided. To begin, the retractable measuring and cutting device 100 may be in a closed and/or fixed position (not shown). When in the closed and/or fixed position, the first handle 103 and the second handle 106 may be described as forming a uniform body when the measuring tool 109 is retracted into the interior of the measuring tool storage 112. In various embodiments, the first handle 103 and the second handle 106 may be secured to each other when in the closed and/or fixed position using a fastener, a snap lock, or a similar component.

By pulling the first handle 103 and the second handle 106 in opposite directions (or by keeping one of the handles in a fixed location and pulling the other handle in a direction away from the handle in the fixed location), the measuring tool 109 may extract out from an interior of the measuring tool storage 112 to an exterior, whereby dimensions on the measuring tool 109 are capable of being viewed by an operator of the retractable measuring and cutting device 100.

As a non-limiting example, the operator of the retractable measuring and cutting device 100 may place a material to be cut in the guide 115 and may hold the first handle 103 to secure the material to the first handle 103. In various embodiments, the material may be placed in the guide 115 to facilitate securing at least one end of the retractable measuring and cutting device 100 to the material. The operator may use his or her right hand gripped around the second handle 106 and pull the measuring tool 109 from the interior of the measuring tool storage 112 in a direction opposite of the first handle 103 (e.g., in a right direction).

The operator may use dimensions on the measuring tool 109 to determine an appropriate location to cut the material, as can be appreciated. When the user has positioned the second handle 106 of the retractable measuring and cutting device 100 in a suitable location, the operator may use the measuring tool lock 130 to secure the measuring tool 109 in a fixed position. In embodiments where the measuring tool 109 comprises a bistable spring steel band, the measuring tool 109 may provide structure, rigidity, and/or stabilization between the first handle 103 and the second handle 106.

To perform a cut, the operator may extend the blade 121 from an interior of the second handle 106 to a fixed exterior position using the blade retractor 124. As the blade 121 is exposed to a surface of the material, the operator of the retractable measuring and cutting device 100 may pull the first handle 103 and the second handle 106 downwards, or in any other suitable direction, to perform a straight cut along a length of the material. For example, assuming the operator starts a cut at a top of the material, the operator would move both the first handle 103 and the second handle 106 downwards, whereby an end of the material in the guide 115 would slide through the guide 115 on the first handle 103 while the blade 121 of the second handle 106 performs a cut at a particular location in the material.

In various embodiments, the first handle 103 comprises a left handle for use by a left hand of an operator and the second handle 106 comprises a right handle for use by a right hand of the operator. However, the components shown on the first handle 103 may be reversed and may be located on the second handle 106, and vice versa, for operators more comfortable in performing cuts with their left hand.

In some embodiments, the components of the retractable measuring and cutting device 100 may be included in a "kit," where an operator of the kit may uses the components shown in FIG. 1A to modify commercially available products. For example, the measuring device storage 112 may comprise a commercially available tape measurer, where the left handle 103 is configured to detachably attach to the tape measurer and the second handle 106 is configured to detachably attach to an end of tape of the tape measurer.

Figure 1B:
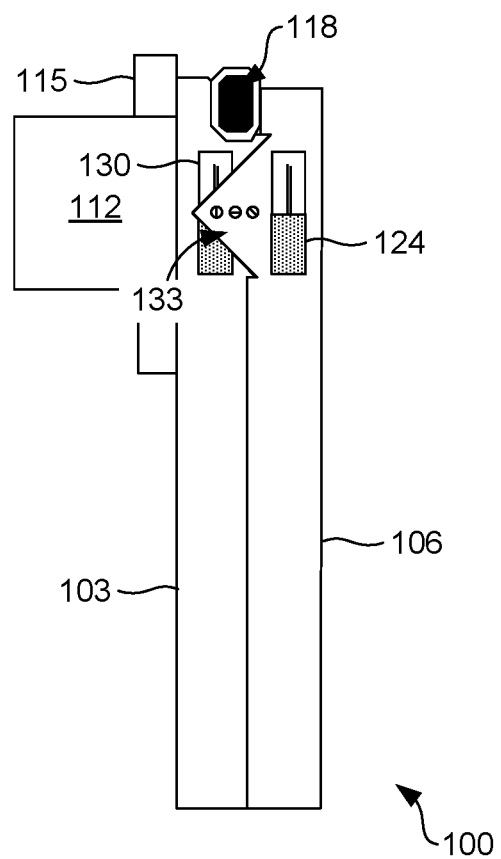

Referring next to FIG. 1B, shown is another example of the retractable measuring and cutting device 100 in a closed and/or fixed position where the measuring tool 109 is positioned in an interior of the measuring tool storage 112. Further, in the non-limiting example of FIG. 1B, shown is the retractable measuring and cutting device 100 comprising the first handle 103, the second handle 106, the measuring tool storage 112, the guide 115, the marking utensil holder 118, the blade retractor 124, the measuring tool lock 130, and the mounting block 133.

As noted above, when in operation, the measuring tool 109 may extract from an interior of the measuring tool storage 112 to be located in a position between the first handle 103 and the second handle 106. To this end, the measuring tool storage 112 may comprise a spring or other device that facilitates the retracting of the measuring tool 109. For example, when the measuring tool 109 is pulled from an interior of the measuring tool storage 112 to an exterior, a spring inside the measuring tool storage 112 may unwind, thereby storing energy in the spring itself that will be used to retract the measuring tool 109 in a coil or other minimized position. The measuring tool lock 130 may comprise a switch that grabs and holds the measuring tool 109 at its position to prevent the spring in the interior of the measuring tool storage 112 from retracting the measuring tool 109. As can be appreciated, when the measuring tool lock 130 is released, the spring retracts and pulls the measuring tool 109 back into the interior of the measuring tool storage 112, as shown in FIG. 1B.

Figure 1C:
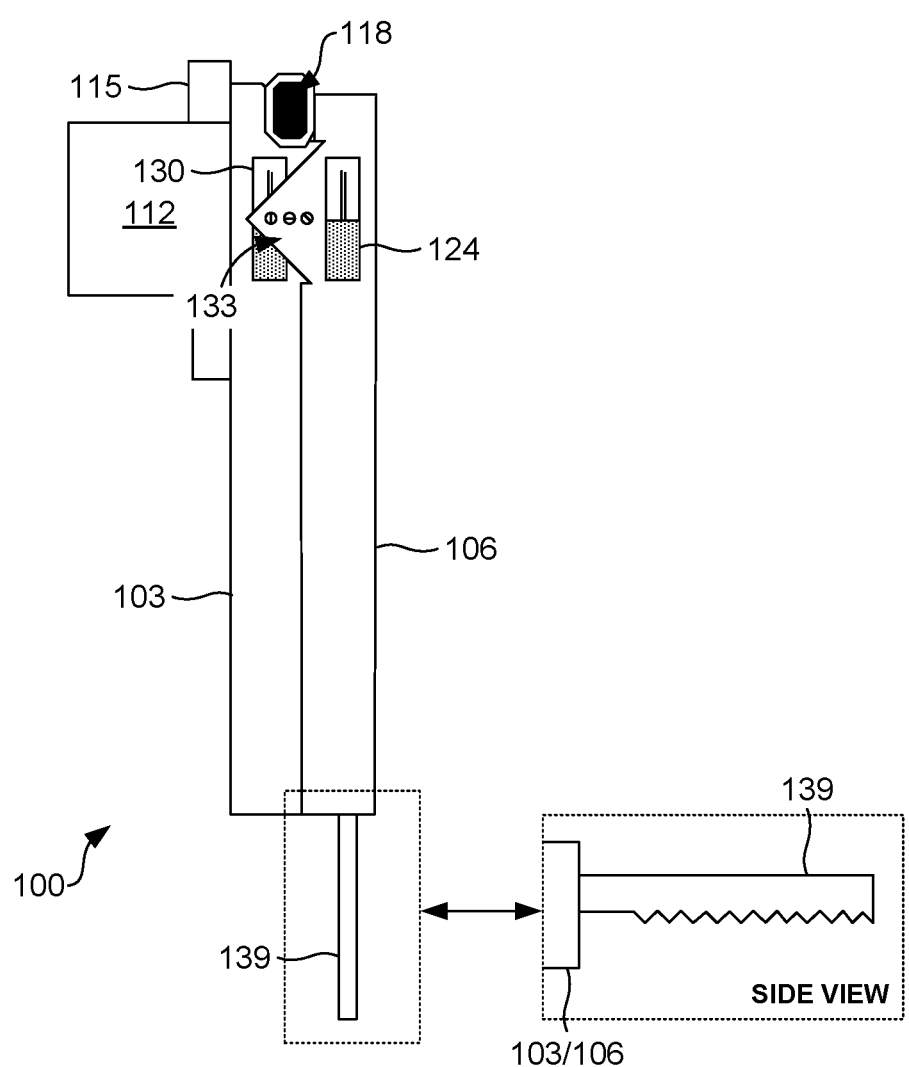

In FIG. 1C, shown is another example of the retractable measuring and cutting device 100 in a closed and/or fixed position where the measuring tool 109 is positioned in an interior of the measuring tool storage 112. Further, the first handle 103 and/or the second handle 106 may comprise a saw blade retractor 136 configured to extract a saw blade 139 from an interior of the corresponding handle to an exterior for cutting. As may be appreciated, the saw blade 139 may comprise a serrated blade or a uniform blade and for use in cutting drywall or other suitable materials.

Figure 1D:
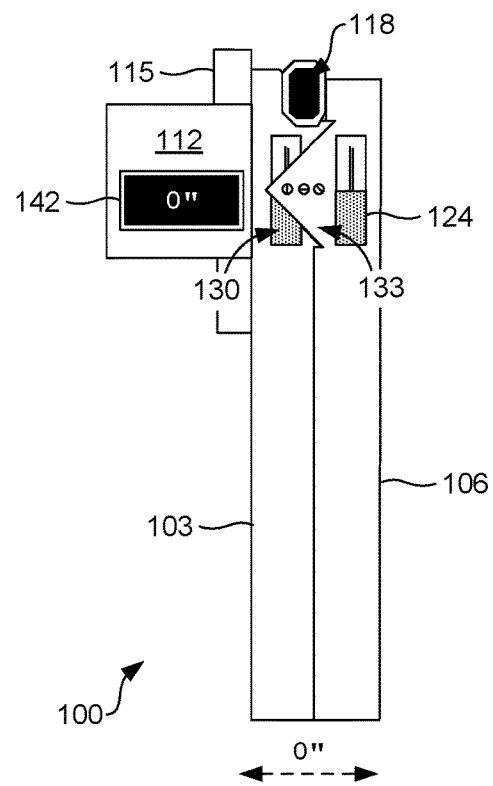
Figure 1E:
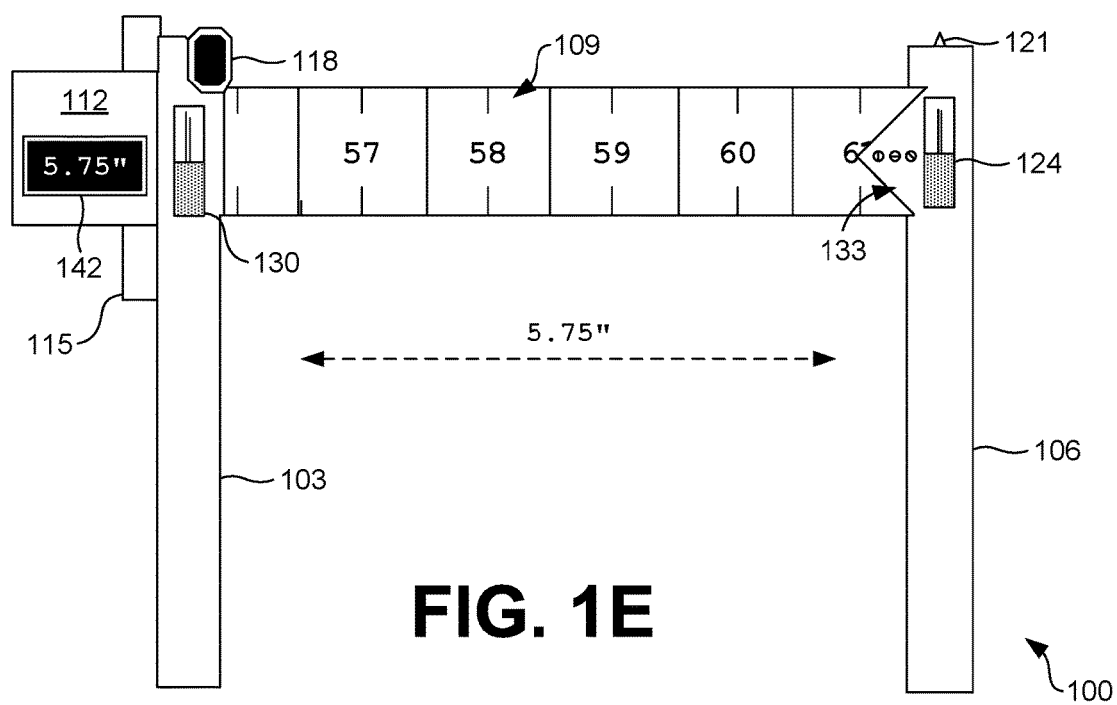

Turning now to FIG. 1D and FIG. 1E, shown is an example of the retractable measuring and cutting device 100 in a closed position and an open position, respectively, where the retractable measuring and cutting device 100 comprises a display 142. To this end, in various embodiments, the retractable measuring and cutting device 100 may comprise processing circuitry capable of measuring a distance the restorable measuring and cutting device 100 is pulled from the measuring tool storage 112. For example, the display 142 shown in FIG. 1D reads "0 inches" as the measuring tool 109 has not been pulled from the measuring tool storage 112 while the display 142 shown in FIG. 1E reads "5.75 inches" as the measuring tool 109 has been pulled that length.

The processing circuitry may comprise a microprocessor or equivalent circuitry that includes memory and program instructions stored thereon. Further, the processing circuitry may be coupled to one or more sensors to determine the length shown in the display 142. In one embodiment, a distance sensor may measure a distance between the first handle 103 and the second handle 106. To this end, in various embodiments, the distance sensor may comprise a laser sensor, an optical sensor, a sonar sensor, or other suitable sensor. The distance sensor may be placed, for example, on the first handle 103 facing the second handle 106, or vice versa. The display 142 may comprise a liquid-crystal display, a light emitting diode (LED) display, or other type of display suitable of displaying a measurement.

In other embodiments, machine-readable identifiers may be placed on the measuring tool 109 where a sensor device is capable of detecting the machine-readable identifiers and identify how much of the measuring tool 109 has been pulled from or inserted back into the measuring tool storage 112. Further, the units of measurement shown in the display 142 may vary from inches shown in FIG. 1D and FIG. 1E. For example, the units shown in the display 142 may include other units such as meters, centimeters, feet, or other suitable unit of measurement.

Figure 1F:
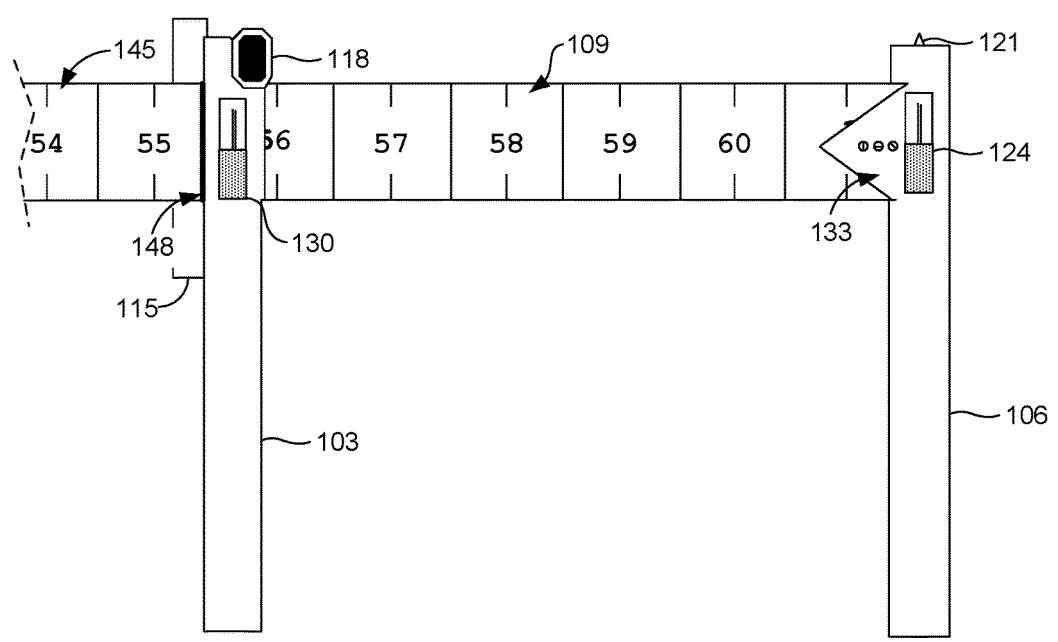

Turning now to FIG. 1F, shown is an example where the measuring tool 109 comprises a fixed, non-flexible material. For example, the measuring tool 109 may comprise a flat piece of aluminum, steel, or wood having measurements placed thereon, although other types of materials may be suitable. To this end, the example shown in FIG. 1F does not require the measuring tool storage 112. Instead, a back end 145 of the measuring tool 109 may slide outside of a portal 148 in the first handle 103 (or in the second handle 106 in other embodiments).

Figure 2:
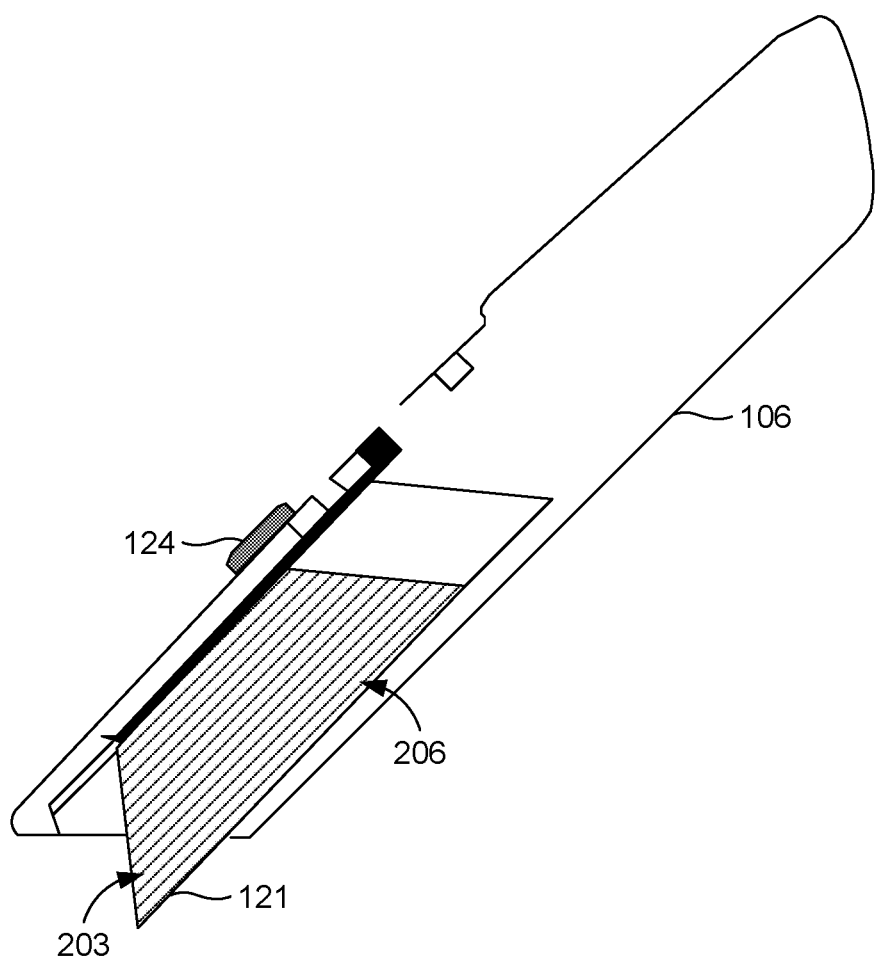
FIG. 2 is a drawing of a side view of a second handle of the retractable measuring and cutting device of according to various embodiments of the present disclosure.

Moving on to FIG. 2, shown is a side view of the second handle 106 of the retractable measuring and cutting device 100 according to various embodiments of the present disclosure. In the non-limiting example of FIG. 2, the second handle 106 may comprise the blade 121, the blade retractor 124, the measuring tool lock 130, and/or other components. As can be appreciated, a front portion 203 the blade 121 is positioned outside of an interior of the second handle 106 while a second portion 206 of the blade 121 is positioned inside the second handle 106 to avoid cutting or harming the hand of the operator.

Figure 3:
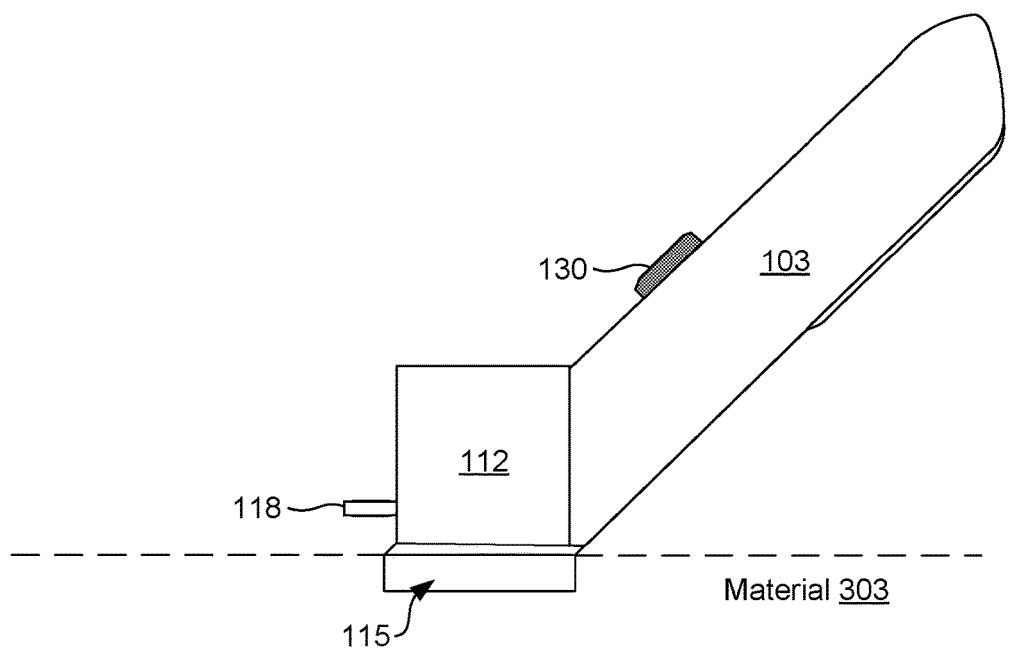
FIG. 3 is a drawing of a side view of a first handle of the retractable measuring and cutting device according to various embodiments of the present disclosure.

Moving on to FIG. 3, shown is a side and interior view of the first handle 103 of the retractable measuring and cutting device 100 according to various embodiments of the present disclosure. In the non-limiting example of FIG. 3, the first handle 103 comprises the measuring tool storage 112, the guide 115, the marking utensil holder 118, and/or other components.

Figure 4:
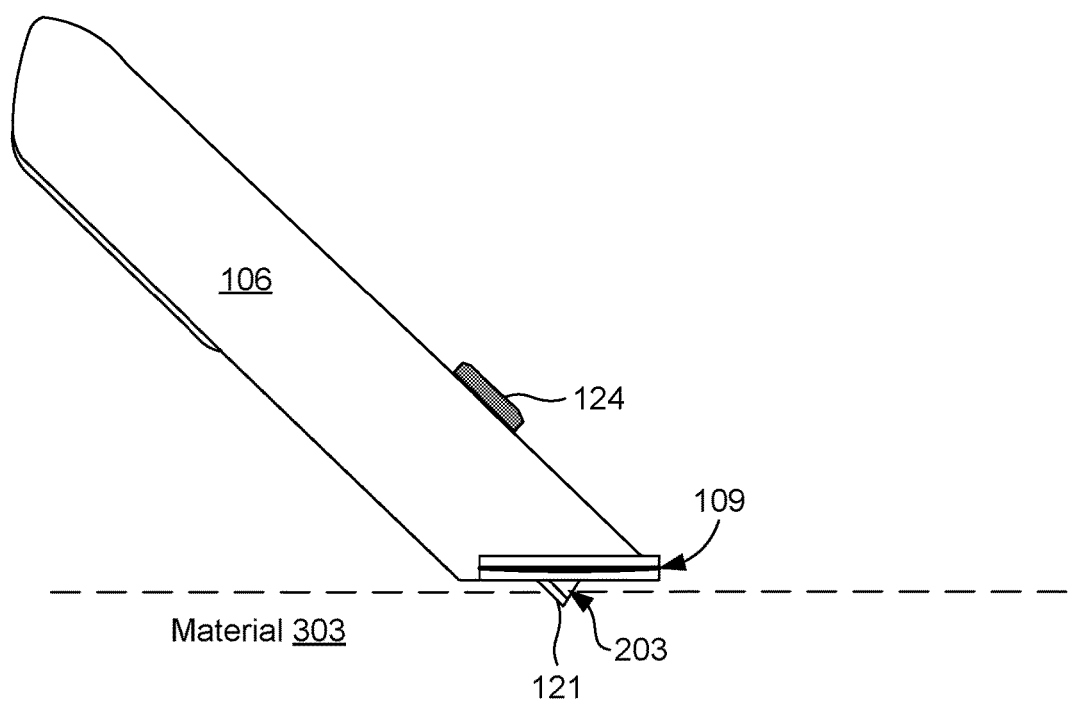
FIG. 4 is a drawing of another side view of the second handle of the retractable measuring and cutting device according to various embodiments of the present disclosure.

Moving on to FIG. 4, shown is another side view of the second handle 106 of the retractable measuring and cutting device 100 according to various embodiments of the present disclosure. In the non-limiting example of FIG. 2, the second handle 106 may comprise the blade 121, the blade retractor 124, the measuring tool lock 130, the measuring tool 109, and/or other components. As can be appreciated, a front portion 203 the blade 121 is positioned outside of an interior of the second handle 106 while a second portion 206 of the blade 121 is positioned inside the second handle 106 to avoid cutting or harming the hand of the operator.

Figure 5:
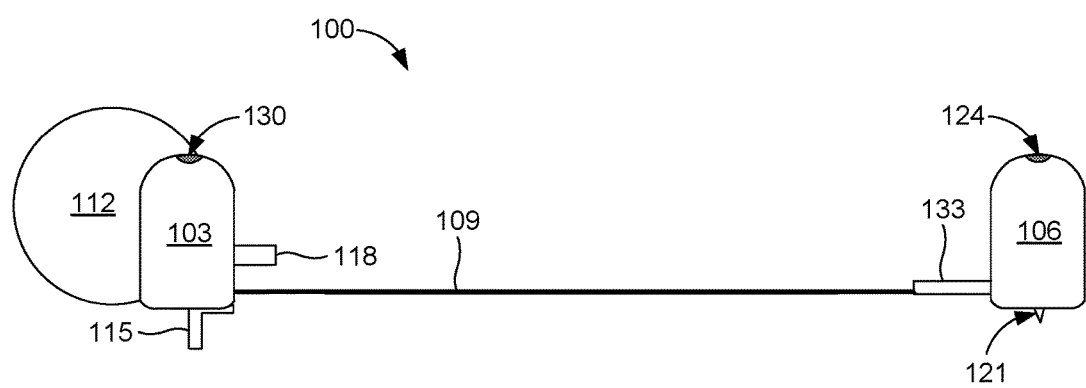
FIG. 5 is a drawing of a rear view of the retractable measuring and cutting device according to various embodiments of the present disclosure.

With reference to FIG. 5, shown is a rear view of the retractable measuring and cutting device 100 according to various embodiments of the present disclosure. In the non-limiting example of FIG. 5, the retractable measuring and cutting device 100 comprises the first handle 103, the second handle 106, the measuring tool 109, the measuring tool storage 112, the guide 115, the marking utensil holder 118, the blade 121, the blade retractor 124, the measuring tool lock 130, the mounting block 133, and/or other components.

When in operation, the measuring tool 109 may retract from an interior of the measuring tool storage 112 to an exterior located in a position between the first handle 103 and the second handle 106. To this end, the measuring tool storage 112 may comprise a bistable steel spring band or other suitable device that facilitates the retracting of the measuring tool 109 while providing some support between the first handle 103 and the second handle 106.

The guide 115 may be used to position and retain the retractable measuring and cutting device 100 at an end of a particular type of material, such as drywall, tile, particle board, cardboard, plywood, linoleum, brick, stone, string, plexiglass, glass, and/or any other suitable material. To this end, the guide 115 may comprise an L-shaped projection that causes an end of the material to closely conform to the guide 115, thereby securing the material to the first handle 103.

The blade 121 may comprise a utility knife blade, an X-Acto® knife blade, or a box cutter blade according to various embodiments. As can be appreciated, the blade 121 may comprise a blade suitable for cutting different types of materials. For example, assuming an operator of the retractable measuring and cutting device 100 desires to cut tile or stone, the blade 121 may comprise a diamond blade commonly used to cut tile and stone. In various embodiments, the blade 121 may comprise a steel blade, a carbide blade, a diamond blade, an abrasive blade, or any other suitable blade.

The blade retractor 124 may comprise a component that allows an operator to adjust a length corresponding to how far the blade 121 extends from the second handle 106. For example, the blade 121 can be extended to a length to cut drywall without performing a cut through an entirety of the drywall. In various embodiments, the blade 121 may be replaced with a spare blade stored in an interior of the measuring tool storage 112, the first handle 103, and/or the second handle 106. For example, an interior of the first handle 103 and/or the second handle 106 may be accessed by removing a screw and opening the handle.

The mounting block 133 may be configured to secure the measuring tool 109 to the second handle 106. To this end, the mounting block 133 may comprise a triangular- or rectangular-shaped projection of the second handle 106 that may be screwed or otherwise fixed into an end of the measuring tool 109.

Figure 6:
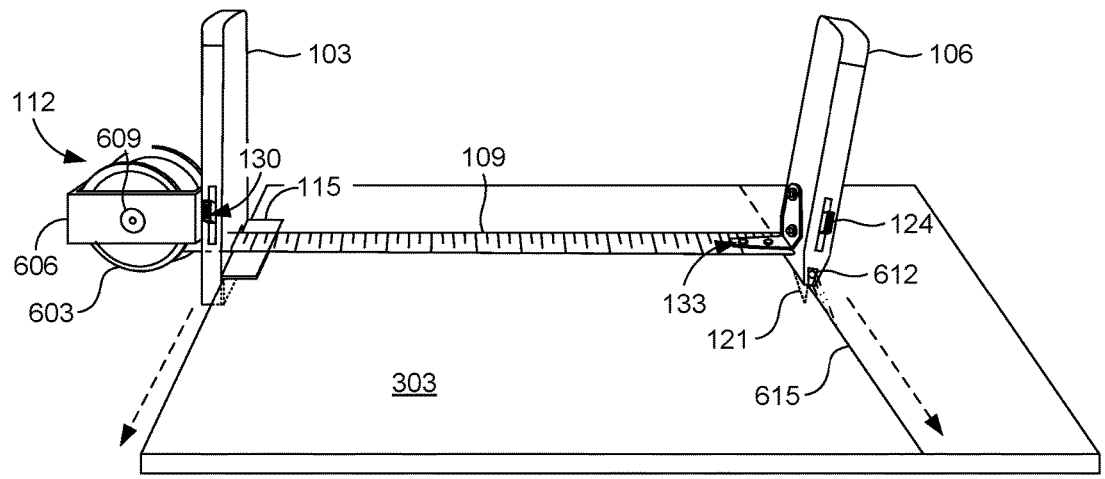
FIG. 6 is a drawing of a perspective view of the retractable measuring and cutting device according to various embodiments of the present disclosure.

With respect to FIG. 6, shown is a perspective view of the retractable measuring and cutting device 100 in an open position where all or a portion of the measuring tool 109 is located an exterior from the measuring tool storage 112. In various embodiments of the present disclosure, the retractable measuring and cutting device 100 comprises the first handle 103, the second handle 106, the measuring tool 109, the measuring tool storage 112, the guide 115, the blade 121, the blade retractor 124, the measuring tool lock 130, the mounting block 133, and/or other components. The retractable measuring and cutting device 100 may be used to perform cuts of a material 303 using the blade 121, as may be appreciated. Further, although not shown in the non-limiting example of FIG. 6, the retractable measuring and cutting device 100 may further comprise the marking utensil holder 118 and/or other components.

In various embodiments, the measuring tool storage 112 may include a spool 603 for which the measuring tool 109 wraps around when retracted. A bracket 606 may mount the spool 603 to the first handle 103. In further embodiments, a cover (not shown) may be applied to protect the measuring tool 109 as it is wrapped around the spool 603. A bearing 609 facilitates rotation of the spool 603 as the measuring tool 109 is wound around the spool 603.

In some embodiments, a side of the retractable measuring and cutting device 100 that includes the blade 121 may further comprise a light projecting device 612 that projects an illuminated line 615 along a surface of the material 303 to be cut. In various embodiments, the light projecting device 612 may comprise a light-emitting diode (LED), a laser light projector, or other suitable device capable of projecting the illuminated line 615. In embodiments where the light projecting device 612 comprises an LED, a red LED, a green LED, or other suitable color of LED may be employed. In some embodiments, the retractable measuring and cutting device 100 may comprise processing circuitry that allows an operator of the retractable measuring and cutting device 100 to change a color of the illuminated line 615 via the light projecting device 612. For example, an operator may toggle between a red line, a green line, or other color line depending on a type of the material 303 being cut.

Figure 7:
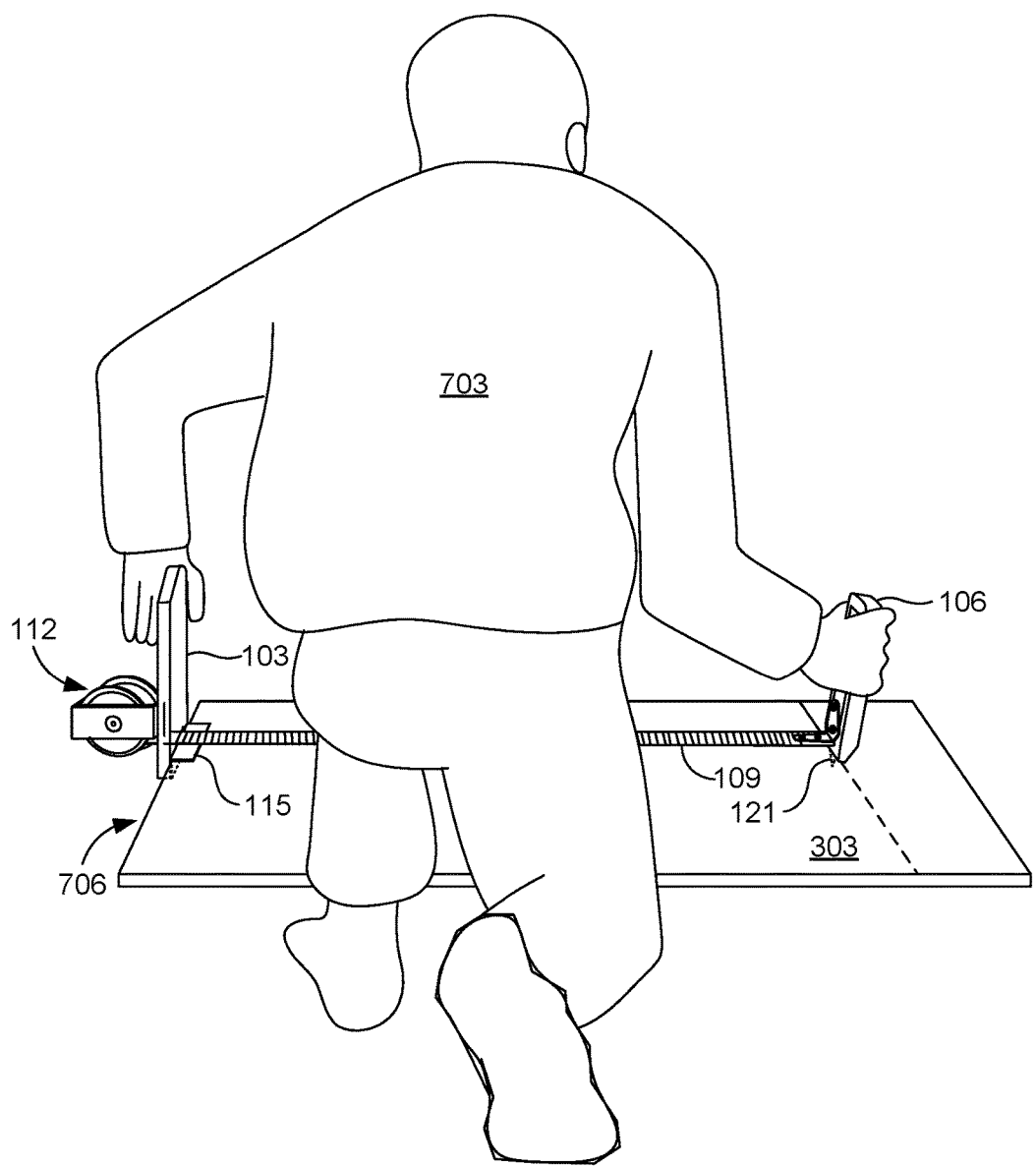
FIG. 7 is a drawing showing an operator or a handler using the retractable measuring and cutting device to cut material according to various embodiments of the present disclosure.

With respect to FIG. 7, shown is another side aerial view of the retractable measuring and cutting device 100 in an open position where all or a portion of the measuring tool 109 is located in an exterior of the measuring tool storage 112. In various embodiments of the present disclosure, the retractable measuring and cutting device 100 comprises the first handle 103, the second handle 106, the measuring tool 109, the measuring tool storage 112, the guide 115, and/or other components. The retractable measuring and cutting device 100 may be used to perform cuts of a material 303. Further, although not shown in the non-limiting example of FIG. 7, the retractable measuring and cutting device 100 may further comprise the blade 121, the blade retractor 124, the marking utensil holder 118, the measuring tool lock 130, the mounting block 133, and/or other components.

To use the retractable measuring and cutting device 100, an operator 703 may pick up the device when it is in a closed and/or fixed position, as the first handle 103 and the second handle 106 may conform to one other to form a uniform body when the measuring tool 109 is retracted into the interior of the measuring tool storage 112 or about the spool 603. The operator 703 starts by securing the first handle 103 at an edge 706 of the material 303, such as by placing the edge 706 of the material 303 in the guide 115, where the rectangular- or square-shaped edge 706 of the material fits into an L-shaped recess of the guide 115.

The operator 703 then pulls the second handle 106 in a linear and horizontal direction away from the first handle 103 to cause the measuring tool 109 to extract out from an interior of the measuring tool storage 112. In this position, dimensions on the measuring tool 109 may be viewable to the operator 703. Using an available hand (e.g., a left hand), the operator 703 may hold the first handle 103 to secure the material 303 in its position in the guide 115. The operator 703 may use his or her other available hand (e.g., a right hand) to pull second handle 106 while pulling the first handle 103 downwards or along the material 303 to perform the suitable cut.

The operator 703 may use dimensions on the measuring tool 109 to determine an appropriate location to cut the material 303, as can be appreciated. In some embodiments, the second handle 106 may be secured at a desired location (e.g., a location of a desired cut) using, for example, the measuring tool lock 130 or by applying pressure to the second handle 106 against a surface of the material 303. In embodiments where the measuring tool 109 comprises a bistable spring steel band, the measuring tool 109 may provide structure, rigidity, and/or stabilization between the first handle 103 and the second handle 106 as it is pulled along the material 303.

The operator 703 may extend the blade 121 from an interior of the second handle 106 to a fixed exterior position using, for example, the blade retractor 124. When the blade 121 is exposed to a surface of the material 303, the operator 703 of the retractable measuring and cutting device 100 pulls the first handle 103 and the second handle 106 downwards, or in any other suitable direction, to perform a straight cut along a length of the material 303. For example, assuming the operator 703 starts a cut at a top of the material, the operator 703 would move both the first handle 103 and the second handle 106 downwards, whereby an end of the material in the guide 115 would slide through the guide 115 on the first handle 103 while the blade 121 of the second handle 106 performs a cut at a particular location in the material. The measuring tool 109 provides structure, especially when locked using the measuring tool lock 130, thereby allowing the operator 703 to make a straight cut. When the cut of the material 303 is complete, the blade 121 may be retracted, the measuring tool lock 130 may be disengaged, and the user can allow the measuring tool 109 to retract into the measuring tool storage 112.

Figure 8:
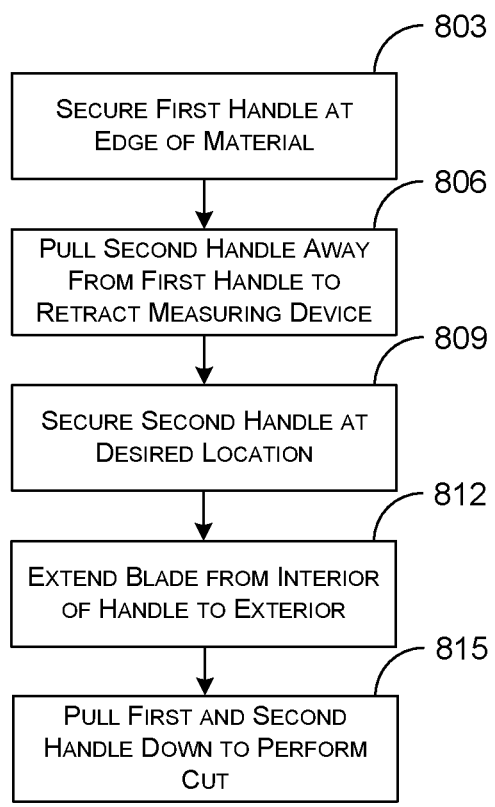
FIG. 8 is a flowchart illustrating one example of functionality implemented using at least the retractable measuring and cutting device of FIG. 1 according to various embodiments of the present disclosure.

Referring next to FIG. 8, shown is a flowchart that provides one example of the operation of at least a portion of the retractable measuring and cutting device 100 according to various embodiments. It is understood that the flowchart of FIG. 8 provides merely an example of the many different types of functional arrangements that may be employed to implement the operation of the retractable measuring and cutting device 100 as described herein.

To begin, the retractable measuring and cutting device 100 may be in a closed and/or fixed position such as the position shown in FIG. 1B. When in the closed and/or fixed position, the first handle 103 and the second handle 106 may be described as forming a uniform body when the measuring tool 109 is retracted into the interior of the measuring tool storage 112. In various embodiments, the first handle 103 and the second handle 106 may be secured to each other when in the closed and/or fixed position using a fastener, a snap lock, or a similar component.

In 803, the first handle 103 is secured at an edge of material 303, such as by placing the edge of the material 303 in the guide 115. Next, in 806, the second handle 106 is pulled away from the first handle 103 to cause the measuring tool 109 to extract out from an interior of the measuring tool storage 112 to an exterior, whereby dimensions on the measuring tool 109 are capable of being viewed by an operator 703 of the retractable measuring and cutting device 100. An example of the measuring tool 109 being exposed is shown in FIG. 1A As a non-limiting example, the operator 703 of the retractable measuring and cutting device 100 may place a material to be cut in the guide 115 and may hold the first handle 103 to secure the material to the first handle 103. In various embodiments, the material may be placed in the guide 115 to facilitate securing at least one end of the retractable measuring and cutting device 100 to the material. The operator 703 may use his or her right hand gripped around the second handle 106 and pull the measuring tool 109 from the interior of the measuring tool storage 112 in a direction opposite of the first handle 103 (e.g., in a right direction).

The operator 703 may use dimensions on the measuring tool 109 to determine an appropriate location to cut the material, as can be appreciated. In 809, the second handle 106 may be secured at the desired location using, for example, the measuring tool lock 130 or by applying pressure to the second handle 106 against a surface of the material 303. In embodiments where the measuring tool 109 comprises a bistable spring steel band, the measuring tool 109 may provide structure, rigidity, and/or stabilization between the first handle 103 and the second handle 106.

Next, in 812, the operator 703 may extend the blade 121 from an interior of the second handle 106 to a fixed exterior position using, for example, the blade retractor 124. In 815, as the blade 121 is exposed to a surface of the material 303, the operator 703 of the retractable measuring and cutting device 100 pulls the first handle 103 and the second handle 106 downwards, or in any other suitable direction, to perform a straight cut along a length of the material 303. For example, assuming the operator 703 starts a cut at a top of the material, the operator 703 would move both the first handle 103 and the second handle 106 downwards, whereby an end of the material in the guide 115 would slide through the guide 115 on the first handle 103 while the blade 121 of the second handle 106 performs a cut at a particular location in the material.

Figure 9A:
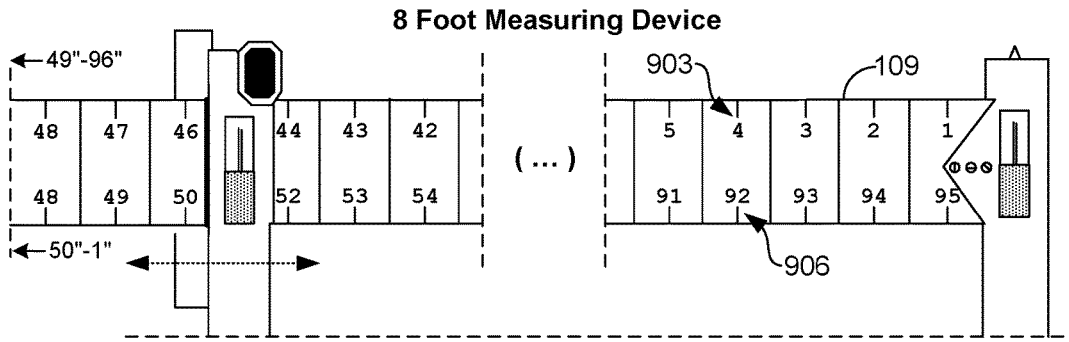
FIGS. 9A-9C are drawings of embodiments of a reverse rule measuring tool that may be implemented in the retractable measuring and cutting device of FIGS. 1A-1F according to various embodiments of the present disclosure.
Figure 9B:
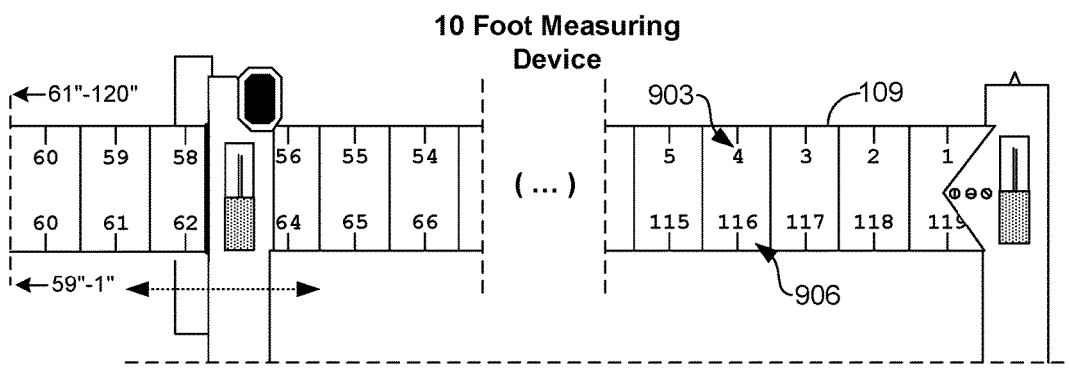
Figure 9C:
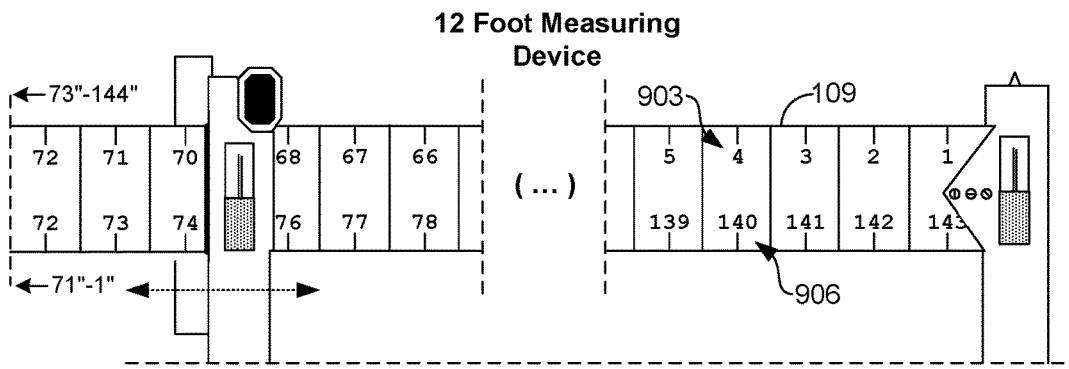

Turning now to FIGS. 9A-9C, different embodiments of a measuring tool 109 implementing a reverse rule labeling system are shown. As may be appreciated, in the United States, it is common for drywall boards to have a width of eight feet, ten feet, or twelve feet. The reverse rule labeling system may be described as having a first row of labels 903 and a second row of labels 906. The first row of labels 903 may comprises a first plurality of dimensions iterating in a first direction (e.g., counting up) while the second row of labels 906 comprises a second plurality of dimensions iterating in a second direction, where the second direction is different than the first direction (e.g., counting down). Accordingly, to facilitate a quick measure and cut with the retractable measuring and cutting device 100, the reverse rule labeling system may be employed as will be described.

With reference to FIG. 9A, an embodiment where the measuring tool 109 measures eight feet in length is shown. At a first end of the measuring tool 109, a first label denotes "1 inch" while a second label shown below the first label denotes "96 inches" (i.e., an eight foot measuring tool 109 comprises of 96 inches). To this end, a first row of the measuring tool 109 may iterate in one direction (e.g., 1, 2, 3, . . . , 94, 95, and 96), while a second row of the measuring tool 109 may iterate in a reverse direction (e.g., 96, 95, 94, . . . , 3, 2, and 1). The first row of the measuring tool 109 may comprise a label equivalent to the second row of the measuring tool 109 at a middle point (e.g., forty-eight inches). If an operator 703 needs to make a piece of drywall four inches in width, the operator 703 may move the first handle 103 along the measuring tool 109 until the first handle 103 is located at four inches (or ninety-three inches) and may place the drywall in the guide 115. The operator 703 can then pull or push the second handle 106 along the surface of the drywall to cut the drywall to create a piece of drywall having a width of four inches.

However, if an operator 703 needs to make a piece of drywall ninety-two inches in width, the operator 703 may move the first handle 103 along the measuring tool 109 until the first handle 103 is located at ninety-two inches (or five inches) and may place the drywall in the guide 115. The operator 703 can then pull or push the second handle 106 along the surface of the drywall to cut the drywall to create a piece of drywall having a width of ninety-two inches.

Similarly, with respect to FIG. 9B, the measuring tool 109 may measure ten feet for use with ten foot or other suitable sized material 303. In the non-limiting example of FIG. 9B, a first label denotes "1 inch" while a second label shown below the first label denotes "120 inches" (i.e., a ten foot measuring tool 109 comprises of 120 inches). The first row of the measuring tool 109 may iterate in one direction (e.g., 1, 2, 3, . . . , 118, 119, and 120), while a second row of the measuring tool 109 may iterate in a reverse direction (e.g., 120, 119, 118, . . . , 3, 2, and 1). The first row of the measuring tool 109 may comprise a label equivalent to the second row of the measuring tool 109 at a middle point (e.g., sixty inches).

Finally, with respect to FIG. 9C, the measuring tool 109 may measure twelve feet for use with twelve foot drywall boards or other suitable sized material 303. In the non-limiting example of FIG. 9C, a first label denotes "1 inch" while a second label shown below the first label denotes "144 inches" (i.e., a twelve foot measuring tool 109 comprises of 144 inches). The first row of the measuring tool 109 may iterate in one direction (e.g., 1, 2, 3, . . . , 142, 143, and 144), while a second row of the measuring tool 109 may iterate in a reverse direction (e.g., 144, 143, 142, . . . , 3, 2, and 1). The first row of the measuring tool 109 may comprise a label equivalent to the second row of the measuring tool 109 at a middle point (e.g., seventy-two inches).

The reverse rule labeling system shown in FIGS. 9A, 9B, and 9C are shown implemented in a retractable measuring and cutting device 100 where the measuring tool 109 comprises a fixed, non-flexible material, such as the embodiment discussed above in FIG. 1F. However, the reverse rule labeling system shown in FIGS. 9A, 9B, and 9C may be implemented in a retractable measuring and cutting device 100 where the measuring tool 109 comprises a flexible bistable spring steel band, such as the embodiments discussed above in FIGS. 1A-1E.

Although the flowchart of FIG. 8 shows a specific order of execution, it is understood that the order of execution may differ from that which is depicted, if possible. For example, the order of execution of two or more blocks may be scrambled relative to the order shown, if possible. Also, two or more blocks shown in succession in FIG. 8 may be executed concurrently or with partial concurrence. Further, in some embodiments, one or more of the blocks shown in FIG. 8 may be skipped or omitted. It is understood that all such variations are within the scope of the present disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A measuring and cutting device, comprising:
a first handle component configured to be gripped by a first hand of an operator, the first handle component having an L-shaped guide offset from a body of the first handle component, the L-shaped guide being configured to receive an end of a material during a linear cut of the material;
a second handle component configured to be gripped by a second hand of the operator, the second handle component comprising a blade configured to perform the linear cut of the material;
a measuring tool storage coupled to the first handle component having an interior for storing a measuring tool;
wherein the measuring tool is disposed between and coupled to both the first handle component and the second handle component, wherein the measuring tool comprises:
a steel spring band having a first row of dimensions and a second row of dimensions affixed thereon, wherein the first row of dimensions measure left-to-right and the second row of dimensions measure right-to-left;
a first end coupled to an interior of the measuring tool storage; and
a second end of the measuring tool being coupled to a side of the second handle component;
wherein the first handle component has a length substantially similar to a length of the second handle component;

wherein the first handle component and the second handle component are configured such that the linear cut of the material is performed when at least a portion of the measuring tool is extracted from the interior of the measuring tool storage and both the first handle component and the second handle component are pulled in a common direction, wherein the L-shaped guide is operable to slide along an edge of the material during the linear cut;

wherein the measuring tool, when extracted, is configured to provide stability during the linear cut of the material; and wherein the first handle component is configured to join the second handle component to form a uniform body when the measuring tool is retracted into the interior of the measuring tool storage.

2. The measuring and cutting device of claim 1, wherein the first handle component further comprises a measuring tool lock configured to lock an amount the measuring tool is extracted from the measuring tool storage.

3. The measuring and cutting device of claim 1, wherein the first handle component or the second handle component further comprises a utensil holder comprising an outlet for a utensil to closely conform to the utensil holder.

4. The measuring and cutting device of claim 1, wherein the second handle component further comprises a light projecting device that projects an illuminated line along a surface of the material.

5. The measuring and cutting device of claim 1, wherein the blade is operable to cut material selected from a group consisting of drywall, tile, particle board, cardboard, plywood, linoleum, brick, stone, string, plexiglass, and glass.

6. The measuring and cutting device of claim 1, wherein a length of the measuring tool is approximately 144 inches for use in cutting 48"×144" drywall boards, 120 inches for use in cutting 48"×120" drywall boards, or 96 inches for use in cutting 48"×96" drywall boards.

7. The measuring and cutting device of claim 1, further comprising:
   processing circuitry configured to measure a length that the second handle is pulled away from the first handle; and
   an electronic display coupled to the processing circuitry, wherein the processing circuitry is configured to cause the length that the second handle is pulled away from the first handle to be rendered in the electronic display.

8. A method, comprising:
providing a measuring and cutting device comprising:
   a first handle component configured to be gripped by a first hand of an operator, the first handle component having an L-shaped guide coupled to a body of the first handle component;
   a second handle component configured to be gripped by a second hand of the operator, the second handle component comprising a blade configured to perform a linear cut of material and having a length substantially similar to a length of the first handle component;
   a measuring tool storage coupled to the first handle component having an interior for storing a measuring tool, the measuring tool disposed between and coupled to both the first handle component and the second handle component, wherein the measuring tool comprises:
      a steel spring band having a first row of dimensions and a second row of dimensions affixed thereon, wherein the first row of dimensions measure left-to-right and the second row of dimensions measure right-to-left;
      a first end coupled to an interior of the measuring tool storage; and
      a second end of the measuring tool being coupled to a side of the second handle component;
   securing the first handle component to an edge of a material by positioning the edge of the material into the L-shaped guide of the first handle component;
   pulling the second handle component in a later direction away from the first handle component to extract the measuring tool from an interior of the measuring tool storage to an extended position; and
   performing the linear cut of the material by pulling both the first handle component and the second handle component along the material in a common direction, wherein the L-shaped guide is operable to slide along an edge of the material during the linear cut, at least a portion of the blade projecting from the second handle component during the linear cut.

9. The method of claim 8, further comprising manipulating a measuring tool lock on the first handle component to fix an amount the measuring tool is extracted from the measuring tool storage.

10. The method of claim 8, wherein the first handle component or the second handle component further comprises a utensil holder comprising an outlet for a utensil to closely conform to the utensil holder.

11. The method of claim 8, further comprising manipulating a light projecting device located on the second handle component to project an illuminated line along a surface of the material.

12. The method of claim 8, wherein the linear cut is performed on material selected from a group consisting of drywall, tile, particle board, cardboard, plywood, linoleum, brick, stone, string, plexiglass, and glass.

13. The method of claim 8, wherein a length of the measuring tool is approximately 144 inches, 120 inches, or 96 inches.

14. The method of claim 8, further comprising:
   measuring, using processing circuitry, a length that the second handle is pulled away from the first handle; and
   rendering, on an electronic display coupled to the processing circuitry, the length that the second handle is pulled away from the first handle.

15. An apparatus, comprising:
   a first handle configured to be gripped by a first hand of an operator, the first handle having a guide configured to receive an edge of a material during a linear cut of a material;
   a second handle configured to be gripped by a second hand of the operator, the second handle comprising a blade configured to perform the linear cut of the material, the second handle having a length substantially similar to a length of the first handle;
   a measuring tool storage coupled to the first handle having an interior;
   a measuring tool disposed between and coupled to both the first handle and the second handle and configured to be stored in the measuring tool storage, wherein the measuring tool comprises:
      a steel spring band having at least a first row of dimensions affixed thereon;
      a first end coupled to the first handle through the measuring tool storage; and a second end of the measuring tool being coupled to the second handle;

wherein the first handle and the second handle are configured such that the linear cut of the material is performed when the first handle and the second handle are pulled in a common direction, wherein the guide is operable to slide along an edge of the material during the linear cut; and wherein the measuring tool, when extracted, is configured to provide stability during the linear cut of the material.

16. The apparatus of claim 15, wherein the first handle is configured to mate with the second handle to form a uniform body when the measuring tool is retracted into the interior of the measuring tool storage.

17. The apparatus of claim 15, wherein a length of the measuring tool is approximately 144 inches, 120 inches, or 96 inches.

18. The apparatus of claim 15, wherein the first handle further comprises a measuring tool lock configured to lock an amount of the measuring tool extracted from the measuring tool storage.

19. The apparatus of claim 15, wherein the guide comprises an L-shaped projection.

20. The apparatus of claim 15, wherein the blade is adapted to cut material selected from a group consisting of drywall, tile, particle board, cardboard, plywood, linoleum, brick, stone, string, plexiglass, and glass.

* * * * *